United States Patent [19]

Talarmo

[11] Patent Number: 5,633,913
[45] Date of Patent: May 27, 1997

[54] METHOD FOR ESTABLISHING CONNECTION BETWEEN COMMUNICATION DEVICES

[75] Inventor: Reino Talarmo, Riihimäki, Finland

[73] Assignee: Nokia Telecommunications Oy, Espoo, Finland

[21] Appl. No.: 436,185
[22] PCT Filed: Nov. 17, 1993
[86] PCT No.: PCT/FI93/00486
§ 371 Date: Jun. 29, 1995
§ 102(e) Date: Jun. 29, 1995
[87] PCT Pub. No.: WO94/11997
PCT Pub. Date: May 26, 1994

[30] Foreign Application Priority Data

Nov. 18, 1992 [FI] Finland ................. 925236

[51] Int. Cl.⁶ .................................................. H04M 11/00
[52] U.S. Cl. ........................... 379/59; 379/57; 455/54.1
[58] Field of Search ........................ 379/60, 59, 58, 379/63, 57; 455/33.2, 54.1, 54.2

[56] References Cited

U.S. PATENT DOCUMENTS

| | | | |
|---|---|---|---|
| 3,818,145 | 6/1974 | Hanway | 379/57 |
| 4,154,988 | 5/1979 | Fechalos et al. | 379/95 X |
| 4,737,978 | 4/1988 | Burke et al. | 379/60 |
| 4,878,051 | 10/1989 | Andros et al. | |
| 4,881,271 | 11/1989 | Yamauchi et al. | 379/60 X |
| 5,077,830 | 12/1991 | Mallia | 455/38.1 |
| 5,153,902 | 10/1992 | Buhl et al. | 379/60 |
| 5,212,822 | 5/1993 | Fukumine et al. | 379/60 |
| 5,387,905 | 2/1995 | Grube et al. | 455/56.1 X |
| 5,390,234 | 2/1995 | Bar-Noy | 379/60 X |
| 5,396,543 | 3/1995 | Beeson et al. | 379/59 |
| 5,428,663 | 6/1995 | Grimes et al. | 379/57 |

FOREIGN PATENT DOCUMENTS 439628   8/1991   European Pat. Off. .

OTHER PUBLICATIONS

Tele Nr 2 1991 pp. 32–45, Focus of Swedish Telecommunications, see pp. 36–37.
Teketsugu, et al: "Holonic Location Registration/Paging Procedure in Microcellular Systems", IEICE Trans, Fundamentals, vol. E75-A, No. 12, Dec. 1992, p. 1652–p. 1659.

*Primary Examiner*—Dwayne Bost
*Assistant Examiner*—Scott Richardson
*Attorney, Agent, or Firm*—Cushman Darby & Cushman IP Group of Madison & Sutro LLP

[57] ABSTRACT

A method for establishing a connection between a first communication device, connected to a communication network and having at least one identity, and one or several second communication devices, connected to the communication network and located in a limited location (i.e., paging) area, each of them having at least one identity. In order that the user of the system may define the location area dynamically, the first communication device sends to the communication network a message containing an identification of the location area and the identity of one or several second communication devices and the communication network calls at least one subscriber device provided with the identity only in the location area defined by the location area identification.

19 Claims, 11 Drawing Sheets

COMMUNICATION DEVICES

COMMUNICATION NETWORK

TLL1 — AREA Ak DEFINITION MESSAGE → TLK1

TLL1 — CALL SET UP MESSAGE(ADDRESS, Ak) → TLK1

CALL SET UP MESSAGE(ADDRESS) TLK2
TLL2 ←

CALL SET UP MESSAGE(ADDRESS) TLK3
TLL3 ←

CALL SET UP MESSAGE(ADDRESS) TLK4
TLL4 ←

| 91 | 92 | 93 |
| ADDRESS | 110100 | OTHER INFORMATION |

| 94 | 95 | 96 |
| ADDRESS | 010000 | OTHER INFORMATION |

| USER IDENTITY | AREA IDENTIFICATION | BASE STATION IDENTITIES OF THE AREA |
|---|---|---|
| 1234 | 75 | 6, 7, 8, 10, 11 |
| 1234 | 82 | 12, 13, 14, 15, 18 |
| 1235 | 82 | 5, 6, 7, 8, 9, 12, 13, 16, 17, 18, 19, 20 |
| GROUP 1 | 150 | 7, 10, 11, 14, 15 |
| GROUP 1 | 151 | 1, 2, 3, 4, 5 |
| "WHO EVER" | 201 | 10, 14, 15, 16, 18, 19 |

METHOD FOR ESTABLISHING CONNECTION BETWEEN COMMUNICATION DEVICES

BACKGROUND OF THE INVENTION

The invention relates to a method and a system for establishing a connection from a first communication device, connected to a communication network and having at least one identity, to one or several second communication devices, connected to the communication network and located in a limited location (paging) area, each of them having at least one identity.

In connection with communication systems, especially radiotelephone systems, it is known that the operator of a communication system may change location areas of particular subscribers or subscriber groups by adjusting switches of a routing and controlling panel (dispatcher) connected to a communication exchange. When a calling subscriber then tries to establish a connection with a called subscriber or a group of several called subscribers and if these are located in a predetermined location area, the communication exchange establishes a connection between the calling subscriber and the called subscriber or subscribers.

A typical problem with communication systems containing mobile subscribers is how a calling subscriber may define the location area of a called subscriber or called subscribers, i.e. the area in which the called subscriber or the members of the group of called subscribers are searched for or paged, when a communication message shall be sent to them or a connection shall be established between them and the calling subscriber. It is necessary to define the location area for instance in a situation in which a calling subscriber wishes to establish a connection with a called subscriber or a group of called subscribers only if the called subscriber or subscribers are located in a predetermined area. For example, the calling subscriber wishes to speak with the called subscriber if this is in the neighbourhood, but he does not want to disturb the called subscriber if this is somewhere else, farther away. A definition of the location area is also necessary if the called subscribers with whom the calling subscriber wishes to speak belong to a larger group of called subscribers, but the calling subscriber wishes to speak only with those located in a predetermined location area, i.e. with a part of the group of called subscribers. An expansion of such a case is a situation in which the part of the group of called subscribers with whom the calling subscriber wishes to speak is moving, whereby it is natural that the calling subscriber frequently wishes to define the location area in which the very part of the group of called subscribers is searched for or paged with whom he wishes to speak. A situation of this kind may turn up in connection with radiotelephone systems, for instance, when the part of the group of called subscribers to be searched for moves for some reason; this may be the case, for instance, when all members of the part of the group follow some moving event, such as a moving sporting event. This is typical in radiotelephone systems, in which very many called subscribers use the same group identity. This situation is also possible in a fixed communication system, e.g. a PSTN (Public Switched Telephone Network), in which subscribers may plug in anywhere in the communication network, if only they inform their location to a database, thus enabling the communication network to route communication messages, phone calls, for subscribers to correct network addresses and so to correct subscribers.

A problem with such a prior art method and system for establishing a connection is that a calling subscriber or some other node of the communication network, such as a controller and/or dispatcher of a particular group of subscribers, is not capable of changing the location area in which a called subscriber or called subscribers are searched for or paged. The only possibility is then that the calling subscriber contacts separately a controlling centre existing in connection with the communication exchange. By giving MML (Man-Machine Language) commands to a routing and controlling panel of an operation and maintenance centre of this exchange the operator may then, at the calling subscriber's command, change the location area in which the called subscriber or subscribers are searched for or paged. A procedure of this kind is naturally very cumbersome for the calling subscriber and the operator and consumes resources of the communication network. Likewise, the controller and/or dispatcher of the group of subscribers has then no possibility of changing the location area directly, without any help from the operator of the respective communication system.

SUMMARY OF THE INVENTION

The object of the present invention is to give a calling subscriber or a network element other than the operation and maintenance centre existing in connection with the communication exchange a possibility of defining dynamically the location area in which a called subscriber or called subscribers are searched for or paged, when messages shall be sent to them or telephone channel connections shall be established with them.

This novel method according to the invention for establishing a connection between communication devices located in a limited location area is characterized in that the first communication device sends to the communication network a message containing an identification of the location area and the identity of one or several second communication devices, the communication network calls at least one subscriber unit provided with said identity only in the location area defined by said location area identification.

This novel system according to the invention for establishing a connection between communication devices located in a limited location area is characterized in that the system comprises: a means for defining the location area and an identification for this area and for sending these definitions as a location area definition message to the communication network, a communication means for receiving a call setup message containing the location area identification sent by the first communication device to the communication network and the identity of one or several second communication devices, for sending the call setup message to one or several communication devices located in said defined location area and for establishing a connection between the first communication device and one or several second communication devices.

The invention is based on the idea that the communication device of a calling subscriber is provided with a property by means of which the calling subscriber may define the location area in which a subscriber called by the calling subscriber is searched for and paged by means of which the calling subscriber may call the called subscriber in this defined location area. It is also possible to implement the location area definition function in some other part of the communication network, e.g. in a separate routing and/or controlling centre or at a control point (dispatcher). The location area may, of course, be defined in several manners.

In this case according to the invention, the location area has been defined both by listing the identities of the base stations or communication exchanges located in the location area and by dividing the area covered by the communication systems into geographical parts indicated by the identities.

An advantage of such a method and system for establishing a connection between communication devices located in a limited location area is that the system does establish connections from the calling subscriber to those called subscribers only with whom an entity which has defined the location area, e.g. the calling subscriber or the separate controller and/or dispatcher, wishes the connections to be established. Signalling capacity of the system is thus saved, because no unnecessary connections are established. Accordingly, this invention uses less communication resources, thus supporting fast call establishment, as the subscribers desire.

Additionally, the inflexible definition of location area according to the prior art, performed by the operator from a separate operation and maintenance panel, is hardly suitable for communication systems having mobile subscribers with a continuously moving location area. The method and the system according to the invention are instead very suitable for defining location areas in such communication systems in which the location area of the subscribers moves continuously, because the definition of location area occurs flexibly and dynamically in this method and system.

According to the method and the system of the invention, the location area may also be defined by somebody else than the operator of the communication network, because this definition may take place by means of a definition of those geographical areas in which a called subscriber/called subscribers are searched for or paged. Then the entity performing the definition does not need to know the addresses, location and number of the base stations or communication exchanges in the location area. Data of the base stations and communication exchanges selected for the location area then only exist in defining, transforming and memory means according to the invention and the operator has them. Accordingly, the subscriber of the communication network is thus given a userfriendly and flexible possibility of defining the location areas in which the called subscribers are searched for or paged.

An additional advantage of the invention is that it may be utilized from any subscriber unit of the communication network, and therefore, no expensive and centralized separate operation and maintenance centre for defining the location area is needed, but any subscriber of the network may easily define the location area, if necessary.

BRIEF DESCRIPTION OF THE INVENTION

In the following, the invention will be explained in greater detail with reference to the attached drawings, in which:

FIG. 1 shows one application area of the invention, i.e. base stations of a radio system and their coverage areas, FIG. 2 shows a diagrammatic plan of some location area definition methods according to the invention in connection with the base stations of the radio system and their coverage areas, FIG. 3 shows some geometrical shapes used by a location area definition method according to the invention, FIG. 4 shows a signalling diagram of a transmission of signalling messages used for establishing a connection in the radio system, FIG. 5 shows a signalling diagram of a transmission of signalling messages used for establishing a connection in a communication system, FIG. 6 shows one embodiment of a system according to the invention for establishing a connection in a radio network, FIG. 7 shows one embodiment of a radio path message utilized by the method and the system of the invention, FIG. 8 shows one embodiment of the system according to the invention for establishing a connection in the radio network, FIG. 9 shows one embodiment of the radio path message utilized by the method and the system of the invention, FIG. 10 shows one embodiment of the system according to the invention for establishing a connection in the radio network, FIG. 11 shows one embodiment of the system according to the invention for establishing a connection in the radio network, FIG. 12 shows one embodiment of the system according to the invention for establishing a connection in a fixed communication network, FIG. 13 shows a memory hierarchy of a memory means utilized by the method and the system according to the invention, FIG. 14 shows detailed examples of location area definition messages according to the invention.

DETAILED DESCRIPTION

Figure 1:
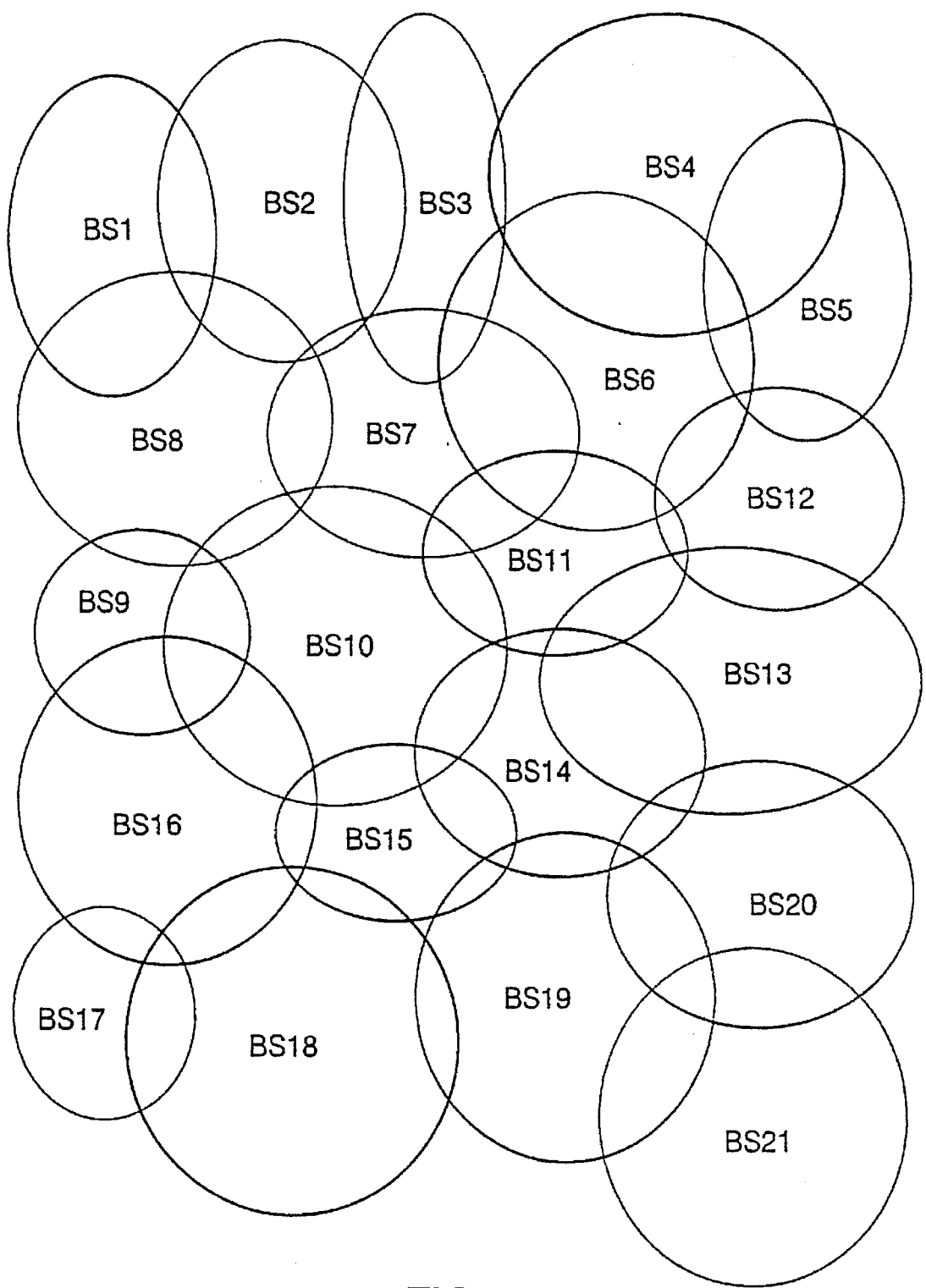

FIG. 1 shows one application area of the invention, i.e. base stations BS1 to BS21 of a radio system and their coverage areas drawn with a thin circular or ellipsoidal line. Each base station BS1 to BS21 is naturally connected to some exchange device, a radio exchange, for example.

Figure 2:
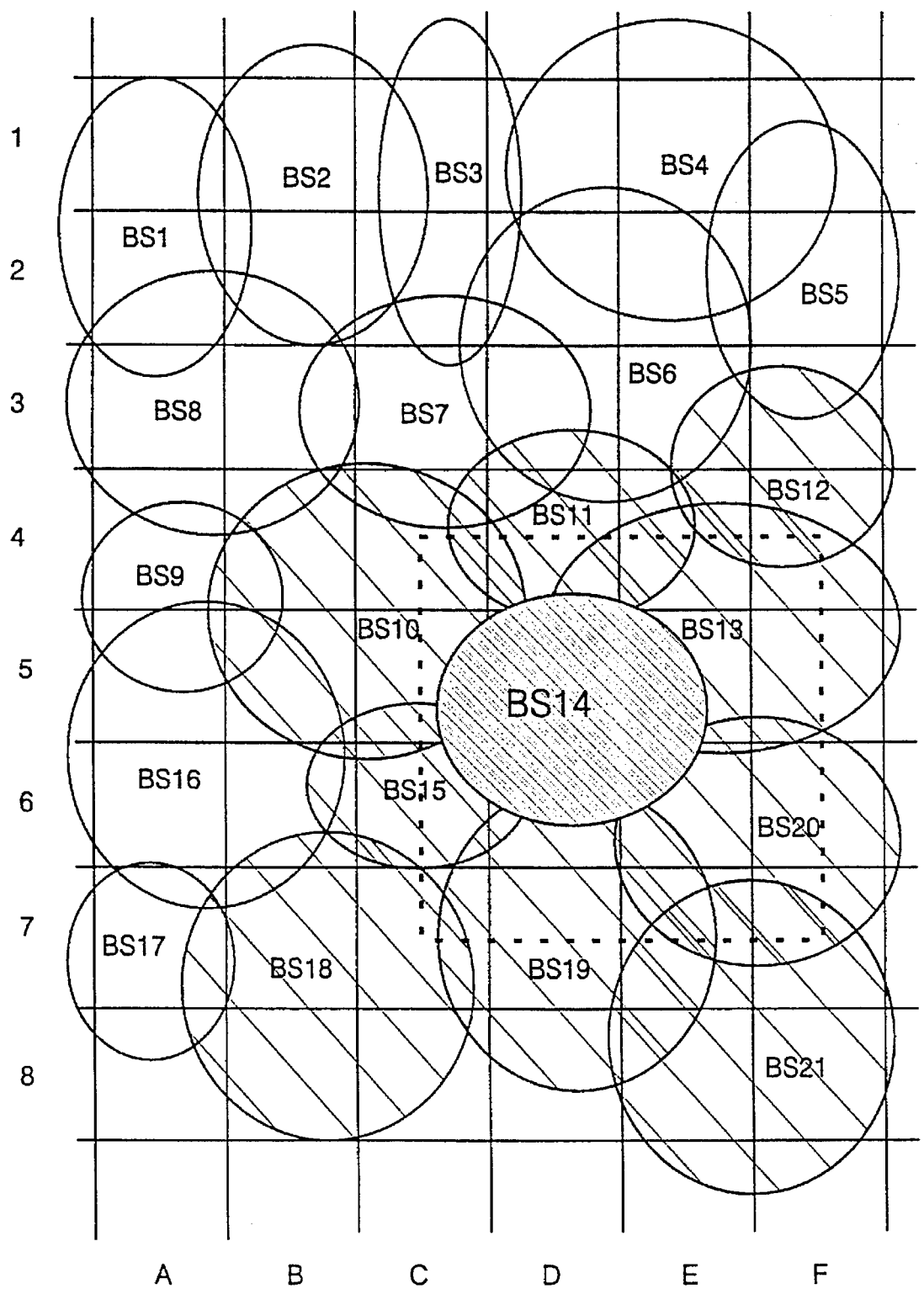

FIG. 2 shows a diagrammatic plan of some location area definition methods according to the invention in connection with the base stations BS1 to BS21 and their coverage areas. One location area definition method according to the invention is based on that an area covered by a communication network, especially a radio network, is divided as per the base stations BS1 to BS21 into areas in which the coverage areas of the base stations comprise the area covered by the communication network. The communication network may also be a fixed system based on wire connections, e.g. a PSTN, ISDN (Integrated Services Digital Network) or IN (Intelligent Network) system, in which the area covered by the communication network is divided into service areas of communication exchanges. In a case based on wire connections, the base stations BS1 to BS21 shown in FIG. 2 may as well be communication exchanges and the coverage areas of the base stations may be service areas of the communication exchanges. Then the location area may be defined by listing identities of those communication exchanges in the service areas of which called subscribers shall be searched for or paged.

Another location area definition method according to the invention is described in the following. A geographical area covered by a communication network, a network based on wire connections or a radio network, is divided into typically polygonal, e.g. square parts marked with area indentifications. These parts may be marked with the area identifications for instance in the manner shown in FIG. 2 by dividing the area covered by the communication network, based on square architecture, in such a way that rows of the square pattern are indicated by the same digit 1 to 8 and columns of the squares are indicated by the same character A, B, C, D, E, F. Each square may then be indicated unambiguously by marking it with a combination of one digit and one character, e.g. A1, D4 and F8. For the definition of the location area, the identifications of those squares are listed which are supposed to form the location area, e.g. the identifications A1, D4 and F8.

The location areas shown in FIG. 2 may be defined in such a way that the identities of those base stations are listed which shall be contained in the location area. It is also possible to list only those base stations which are located at points of discontinuity of the geometrical shape of the desired location area, e.g. at points of vertical intersection of the area, or to list the midpoint and the radius of the area or the midpoint and one circumferential point of the area. In the method and system of the invention, a transforming means of the system then calculates the identities of the base stations of the whole geometrical shape from the identities of the base stations at the points of discontinuity of the geometrical shape, and the identities of all these base stations are used for the definition of the desired location area.

Location areas may also be defined in such a way that the identities of those communication exchanges are listed which are located at the points of discontinuity of the geometrical shape of the desired location area, i.e. at points of vertical intersection of the area, or the midpoint and the radius of the area or the midpoint and one circumferential point of the area are listed. In the method and system of the invention, the transforming means of the system then calculates the identities of the communication exchanges of the whole geometrical shape from the identities of the communication exchanges at the points of discontinuity of the geometrical shape, and the identities of all these communication exchanges are used for the definition of the desired location area.

In addition, the location areas may be defined by means of those parts of the area covered by the communication network which are marked with area identifications in such a way that the area identifications of the parts marked with area identifications and located at points of discontinuity of the geometrical shape of the desired location area, e.g. at points of vertical intersection of the area, are listed or the midpoint and the radius of the area or the midpoint and one circumferential point of the area are listed. In the method and system of the invention, the transforming means of the system then calculates all area identities of the whole geometrical shape from the area identifications of the points of discontinuity of the geometrical shape. All these area identifications are utilized for the definition of the desired location area, when the transforming means transforms the area identifications into identities of those base stations or communication exchanges in the location or service area of which the desired location area is located.

FIG. 2 illustrates a selection of a square location area, performed by the user by means of area identifications. The user has defined the location area by selecting area identifications C4, F4, C7 and F7 as points of vertical intersection for the square geometrical shape. When the system of the invention transforms the area identifications of the geometrical shape to base stations or communication exchanges, the base stations BS10 to BS15 and BS18 to BS21 are selected in the first case. If the user has defined that the location area consists only of the edge area of the geometrical shape, the base station BS14 is excluded from the location area.

Figure 3:
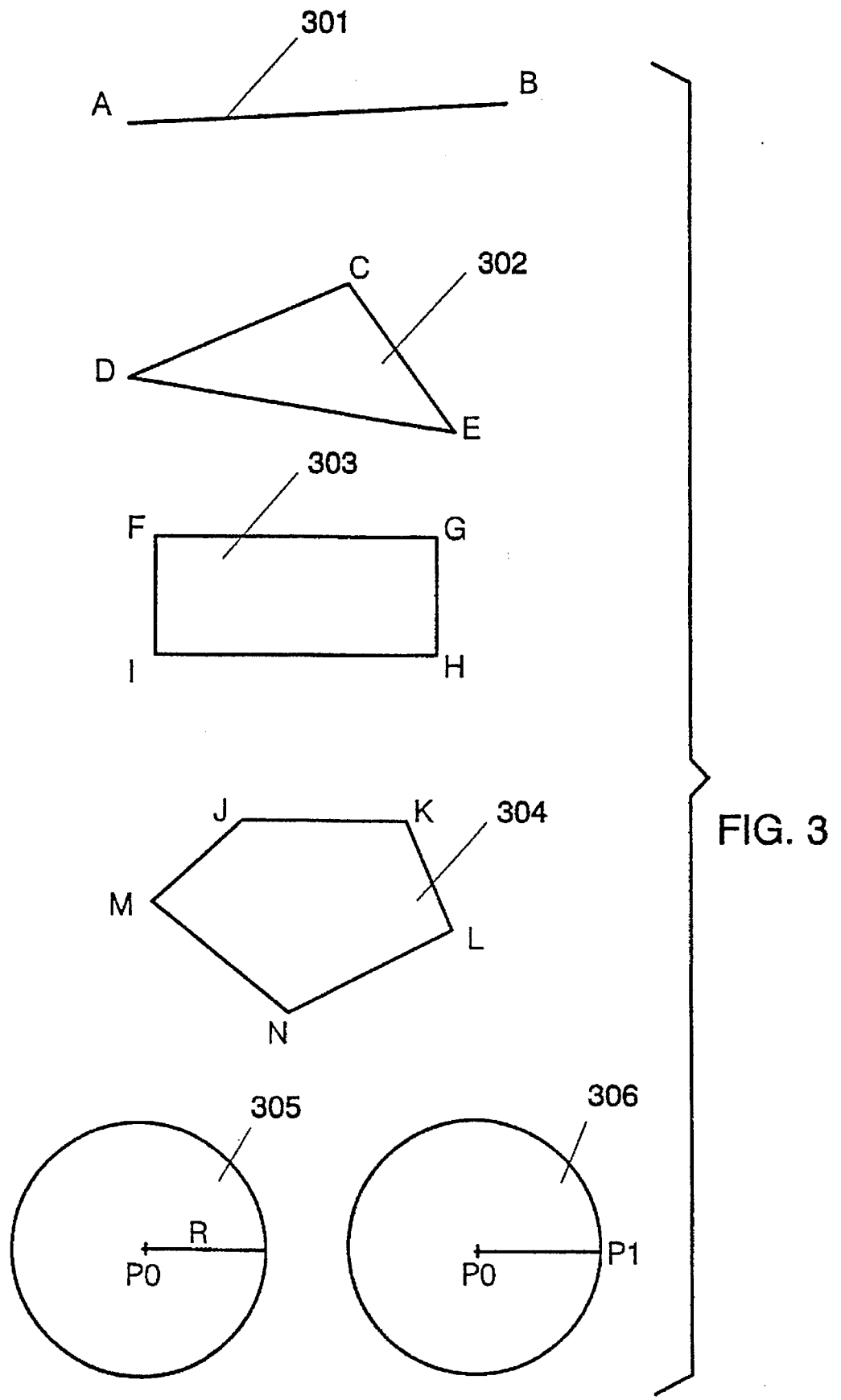

FIG. 3 shows a plurality of geometrical shapes used in the location area definition method according to the invention. Detail figure 301 shows a straight line or a band, which the user of the communication system of the invention may define as location area by giving area identifications of the initial point A and the final point B of the band or the identities of the base stations or communication exchanges at the same geographical location. On the other hand, detail figure 302 shows a triangle C, D, E, which the user may define as location area by giving the area identifications of the points of vertical intersection of the triangle or the identities of the base stations or communication exchanges at the same geographical location. Detail figure 303 shows a quadrangle F, G, H, I, which the user may analogically define as location area by applying the manners described in connection with the explanation of the figures 301 and 302. Detail figure 304 shows a polygon J, K, L, M, N, which the user further may analogically define as location area by applying the manners described in connection with the explanation of the figures 301 and 302. Detail figure 305 shows a circle, which the user may define as location area by giving an area identification of the midpoint P0 of the circle or the identity of the base station or communication exchange at the same geographical location as well as the radius R of the circle. Detail figure 306 shows a circle, which the user may define as location area by giving the area identification of the midpoint P0 of the circle or the identity of the base station or communication exchange at the same geographical location as well as an area identification of a point P1 at the circumference of the circle or the identity of the corresponding base station or communication exchange.

In the method and system of the invention, the user may define whether the location area shall contain the areas contained in these geometrical shapes shown in FIG. 3 or only the edge areas of the geometrical shapes, by defining a filling degree of the location area in a manner to be shown later in FIG. 7.

Figure 4:
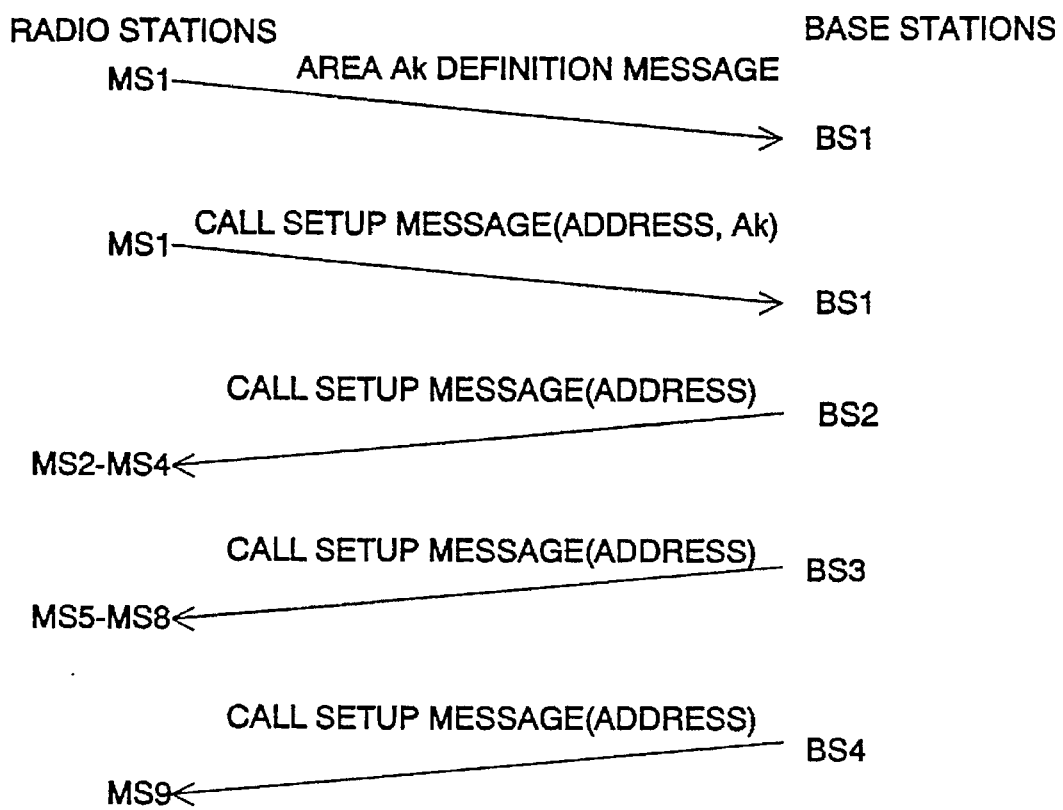
Figure 9:
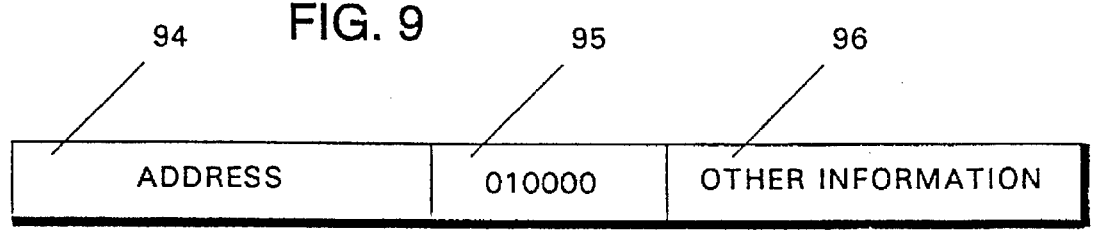

FIG. 4 shows a signalling diagram of a transmission of signalling messages used for establishing a connection in a radio system. A radio station MS1 sends a location area Ak definition message according to the invention, which message will be described in more detail in connection with the explanation of the FIGS. 7, 9 and 14. The location area definition message could also be sent by any other radio station MS2 to MS9 or by some other part of the radio system, e.g. a separate location area definition means connected to some network element. After the base station BS1 has received the location area definition message, the base station BS1 sends an information of the definition of the location area to a memory means shown in FIG. 13 and located in the exchange device of the radio system shown in FIG. 8, which memory means stores the definition of the location area in its memory. Naturally, the location area definition method described here is only one method of implementing the definition of the location area. Next, after an arbitrary time period, the first radio station MS1 sends a call setup message, containing, firstly, the identity or address of that second or those second radio stations with whom the radio station MS1 wishes to establish a connection, and secondly, the identification of that location area in which the radio station MS1 wishes this/these second radio station/stations to be searched for or paged. Then the exchange device of the radio system commands the base stations BS2, BS3, BS4 located in partial areas of the defined location area to send the call setup messages to the radio telephones MS2 to MS4, MS5 to MS8 and MS9 in the coverage areas of these base stations. These call setup messages then contain either the addresses or identities of the current subscribers or the address or identity of that group of subscribers to which these subscribers belong. The reader has noticed that the definition message and the call setup messages described above have been sent on the radio path between the base stations and the radiotelephones in their coverage areas.

Figure 5:
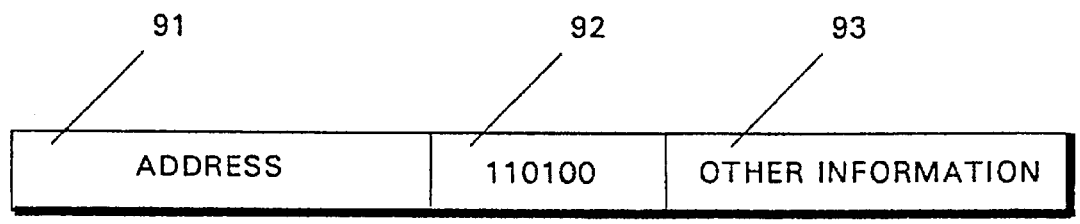

FIG. 5 shows a signalling diagram of a transmission of signalling messages used for establishing a connection in a communication system. In the communication system operating according to the method or device of the invention, a communication device TLL1 sends a location area Ak definition message to a communication exchange TLK1. Some examples of the location area definition message to be sent will be presented in connection with the explanation of the FIGS. 7, 9 and 14. After the communication exchange TLK1 has received the location area definition message, the communication exchange TLK1 stores the definition of the location area in the memory means contained in the communication exchange shown in FIG. 12, which memory means will be illustrated in more detail in FIG. 13. Next, some communication device, in this figure the communication device TLL1, sends a call setup message containing, firstly, the identity or address of that/those second communication device/devices TLL2 to TLL4 with whom the communication device TLL1 wishes to establish a connection, and secondly, the identification Ak of that location area in which the communication device TLL1 wishes these second communication devices TLL2 to TLL4 to be searched for or paged. Some communication exchange of the communication network, in this case the communication exchange TLK1, receives this call setup message and transmits its content to communication exchanges TLK2, TLK3, TLK4 located in the location area Ak defined by the first communication device TLL1 in its location area definition message. After this, these communication exchanges TLK2, TLK3, TLK4 located in the location area send to the communication devices TLL2, TLL3, TLL4, located in their own location area and mentioned in the call setup message sent by the first communication device TLL1, call setup messages provided with the addresses of these communication devices TLL2, TLL3, TLL4 or with the address of that subscriber group to which all these communication devices belong. After this, connections are established between each communication exchange TLK2, TLK3, TLK4 and the respective communication devices TLL2, TLL3, TLL4. It is understandable that the communication devices TLL2, TLL3, TLL4 with which connections are established may be one or several in number. The communication system illustrated in connection with this FIG. 5 may be either a radio system, the radio path and base stations of which have not been illustrated for the sake of simplicity, or a communication system based on wire-line connections, in which system mobile subscribers are possible, however.

Figure 6:
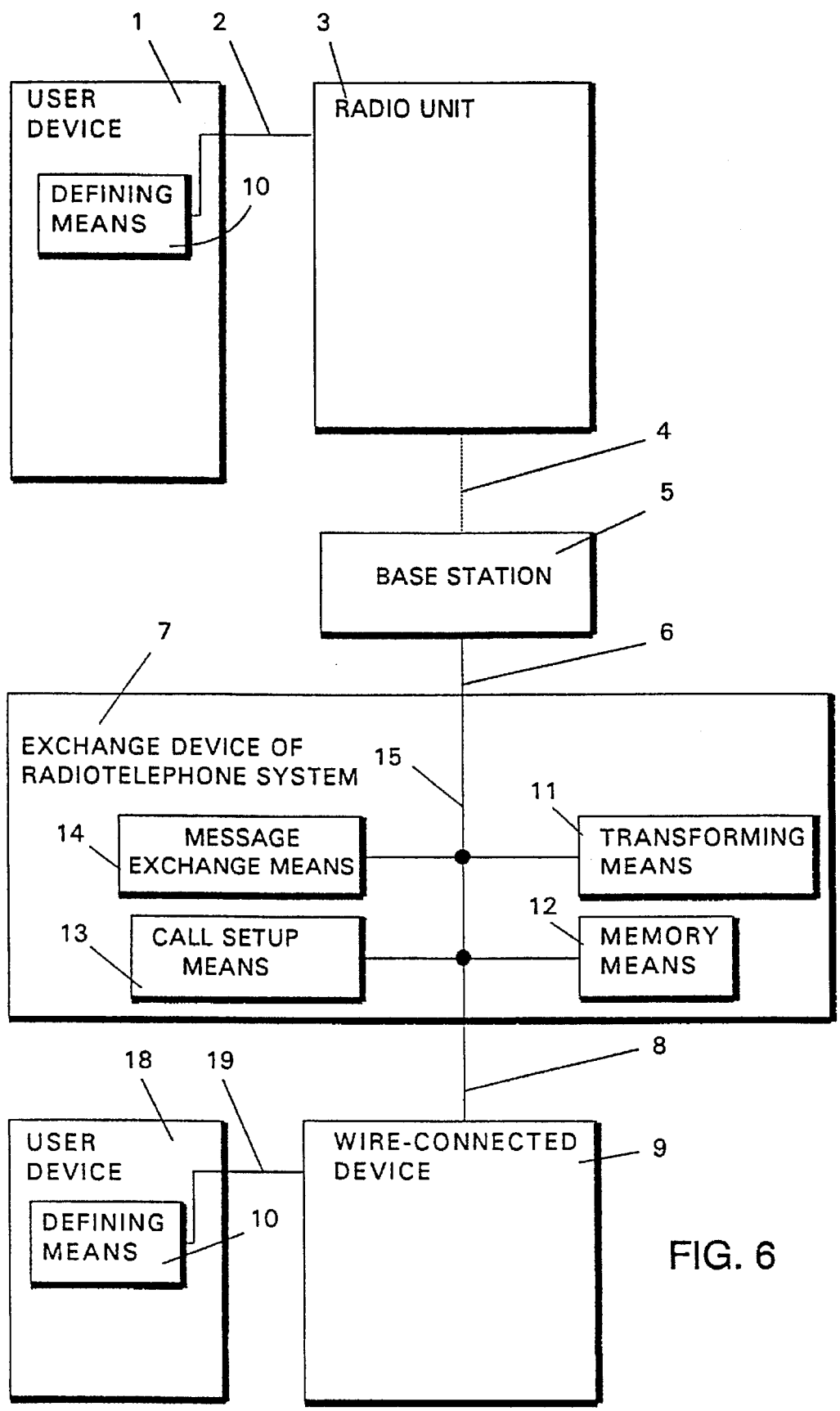

FIG. 6 shows one embodiment of the system according to the invention for defining the location area and/or for establishing a connection in the radio network. The figure shows a first user device 1 provided with a user interface between the subscriber and the communication network. The user device 1 is joined by means of a connecting means 2, typically a cable, to a radio unit 3. The radio unit and the user device may naturally be implemented as one unit. There is a radio connection 4 between the radio unit 3 and a base station 5 of the radio system, from which base station there is, typically over a cable, a further connection 6 to an exchange device 7 of the radio system, in which exchange the data and voice traffic from the base station is transmitted over a connecting means 15 to a means 14 for message exchange. For one skilled in the art it is clear that the base station and the exchange device of the radio system may be implemented as one unit. In addition, a device 9 may be joined to the exchange device of the radio system over a connection 8, typically a cable. To this device 9 is joined further, over a connecting means 19, a second user device 18, which may be similar to the first user device 1 joined to the radio unit 3. The second user device 18 and the device 9 joined over the cable may naturally be implemented as one unit.

In the system according to the invention, the first user device 1 contains a means 10 for defining the location area. A similar location area definition means 10 is included in the second user device 18. By this definition means 10, the user of the system may define the location area in which he wishes subscribers having a particular identification to be searched for or paged. By this definition means, the user forms a location area definition message shown in FIG. 7, i.e. gives the address of that/those communication device/ devices the location area of which he wishes to define. The address may be either some address of the user or some address of another user. In the latter case, depending on the system, a separately granted permission may be needed therefor. In FIG. 7, this address is positioned in field 71, radio address. Then the user forms by the definition means 10 field 72 of the location area definition message, area definition. The area definition of field 72 comprises a definition of the geometrical shape of the area by means of the identities of those geographical parts, base stations or communication exchanges in the area of which the points of discontinuity of the geometrical shape of the location area, the points of vertical intersection of the area, the midpoint and the radius of the area or the midpoint and the circumferential point of the area are located. After this the user defines field 73 of the location area definition message, filling degree of the area, which field indicates whether the location area shall contain only those parts marked with area identifications, base station identities or communication exchange identities which line the geometrical shape or also the parts, base stations or communication exchanges marked with area identifications which are located within the geometrical shape. In addition, the user gives the location area by the defining means an identification he desires to give, which identification is located in field 74 of FIG. 7, area identification.

Figure 7:
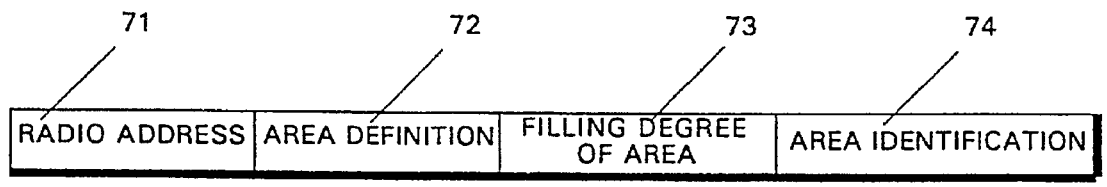

In FIG. 6, the radio unit 3 sends the location area definition message shown in FIG. 7 along a radio path to a base station 5, which sends the message further to the exchange device 7 of the radio system. In the case of the device 9 joined to the system by a wire, to which device the user device 18 is joined, the location area definition message is sent along a wire connection 8 to the exchange device 7 of the radio system. The exchange device 7 transmits the location area definition message to a transforming means 11. In case if the location area has been defined by defining the geometrical shape of the area by means of the identifications of those geographical areas which cover the location area to be defined, the transforming means transforms the location area definition into identities of such base stations or communication exchanges the service areas of which essentially cover the location area. These transformed location area definition data are stored in the memory means 12 included in the exchange device 7 of the radio system according to the memory hierarchy shown in FIG. 13, for example.

Now, when one first radio station of the radio system wishes to establish a connection with a second radio station or a group of radio stations in this defined location area, the first radio station sends in the manner shown in FIG. 4 a call setup message containing the location area identification and the identity of the second radio station or group of radio stations to a base station, which transmits the call setup message to a call setup means 13 of the exchange device 7 of the radio system, which setup means asks the memory means 12 for the identities of the base stations corresponding to the location area identification. After this the call setup means 13 establishes connections between the first radio station and that/those radio station/stations which are located in a location area corresponding to the location area identification and which had in the original call setup message the identity of the second radio station or group of radio stations.

FIG. 7 shows one embodiment of a radio path message used by the method and system of the invention, which message is sent by the entity defining the location area, for example a user device joined to a radio station or a user device joined to a wire-connected device, to the transforming or memory means of the exchange device of the communication exchange or the radio system. Field 71 of the message comprises the identity of that radio or communication device or group the location area of which is in question, i.e. for which radio or communication devices the location area is supposed to be defined. The message further comprises field 72 for area definition, containing a definition of the geometrical shape of the area by means of the identities of those geographical parts, base stations or communication exchanges in the area of which the points of discontinuity of the geometrical shape of the location area, the points of vertical intersection of the area, the midpoint and the radius of the area or the midpoint and the circumferential point of the area are located. Field 73, filling degree of the area, defines whether the location area shall contain only those parts marked with area identifications, base station identities or communication exchange identities which line the geometrical shape or also those parts, base stations or communication exchanges marked with area identifications which are located within the geometrical shape. Field 74, area identification, defines the identification of the location area. This identification may be defined by the entity defining the location area.

Figure 8:
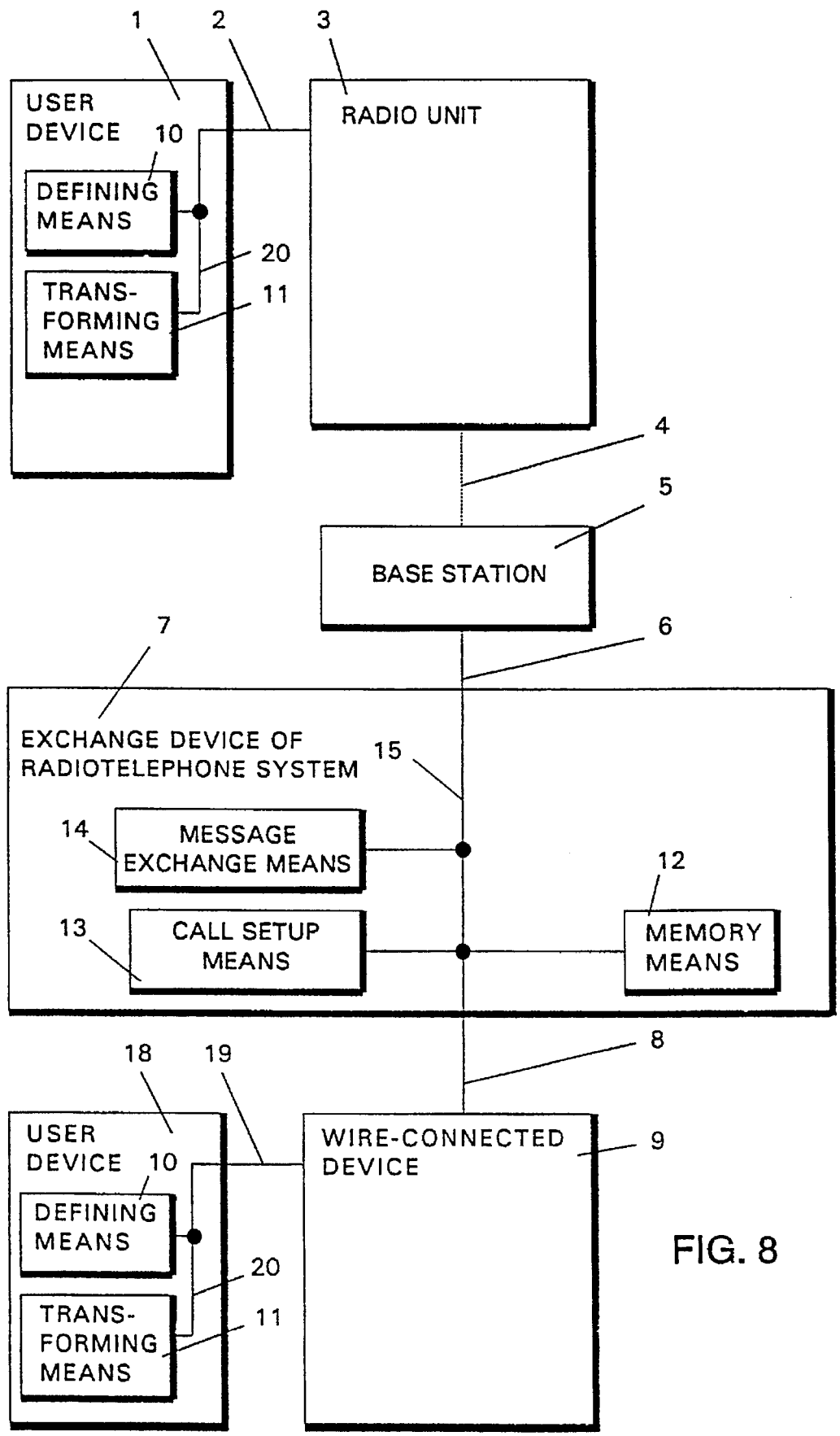

FIG. 8 shows one embodiment of the system according to the invention for defining the location area and/or for establishing a connection in the radio network. The solution of FIG. 8 is similar to that of FIG. 6, except that the transforming means 11 has been removed from the exchange device of the radio system to the user device 1 and 18 in FIG. 8. As a consequence of this, the location area definition message shown in FIG. 9 and to be sent from the user device to the exchange device of the radio system is different from the message shown in FIG. 7. The message shown in FIG. 9 lacks the area definition field 72 and the field 73, filling degree of the area. These fields have been replaced by an identification field 92 according to FIG. 9, specifying the base stations or the communication exchanges, in which field one bit of a binary digit presented identifies one base station or communication exchange. Field 93 of FIG. 9, other information, may contain the location area identification. In the solution of FIG. 8, the location area definition message is sent from the transforming means 11 of the user device 1 or 18 to the memory means 12 of the exchange device 7 of the radio system, either along the radio path 4 or over the base station 5 or along the wire connection 8. The content of field 92 of the definition message (FIG. 9) is stored in the memory means 12. Correspondingly, a call establishment takes place in this embodiment in the same way as described in connection with FIG. 6.

Figure 10:
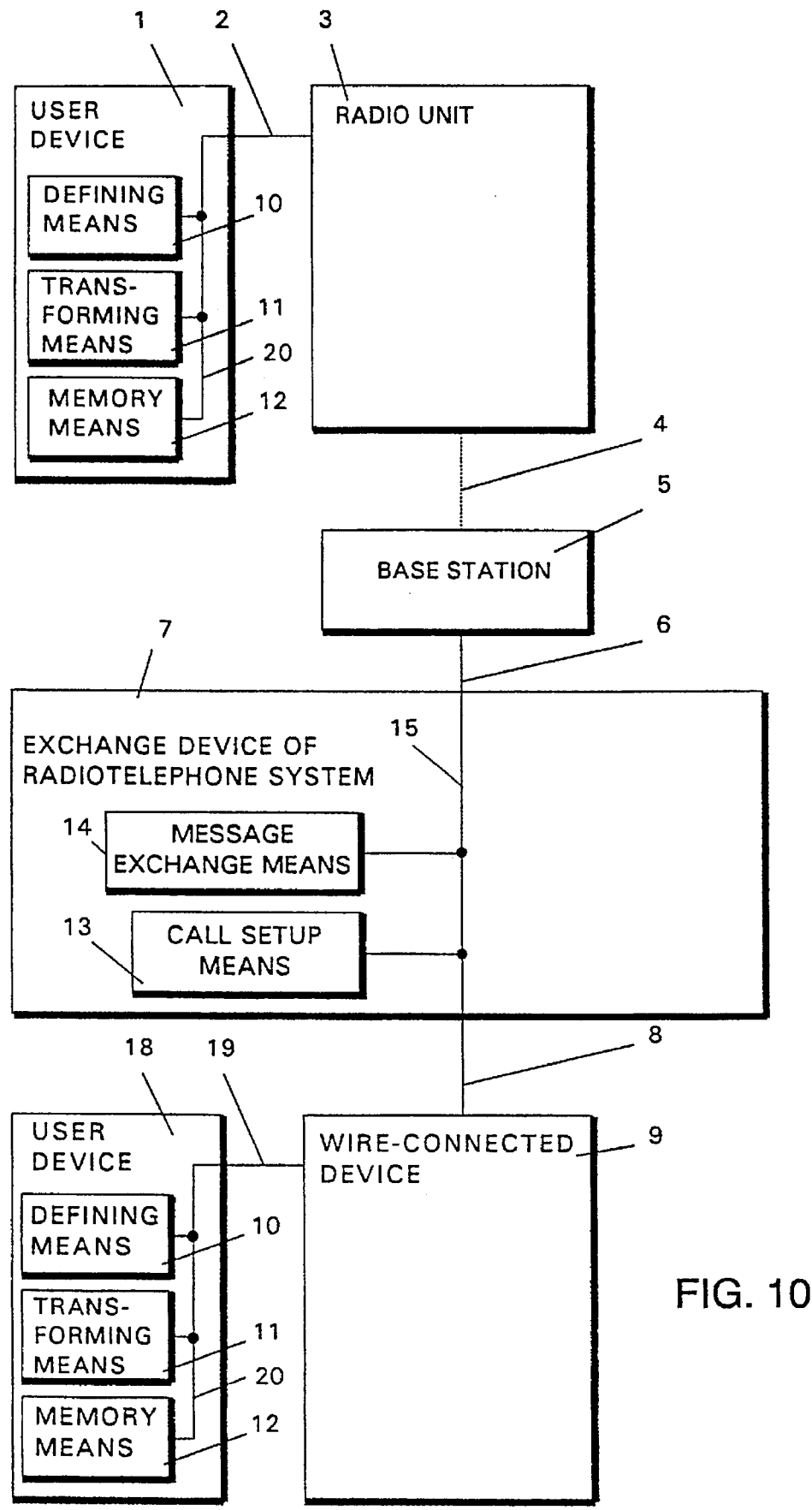

FIG. 10 shows one embodiment of the system according to the invention for establishing a connection in a radio network. This embodiment is similar to that of FIG. 8, except that the memory means 12 in the exchange device of the radio system is located in the user device 1 or 18 in FIG. 8. From this follows that if the first radio station or communication device, here the user device, wishes to establish a connection with the second radio station or communication device, it has to include in the call setup message also the definition of the location area, i.e. the identities of those base stations or communication exchanges in the area of which the first radio station wishes called subscribers to be searched for or paged. Such a definition of base stations and communication exchanges may correspond to the field 92 of FIG. 9.

Figure 11:
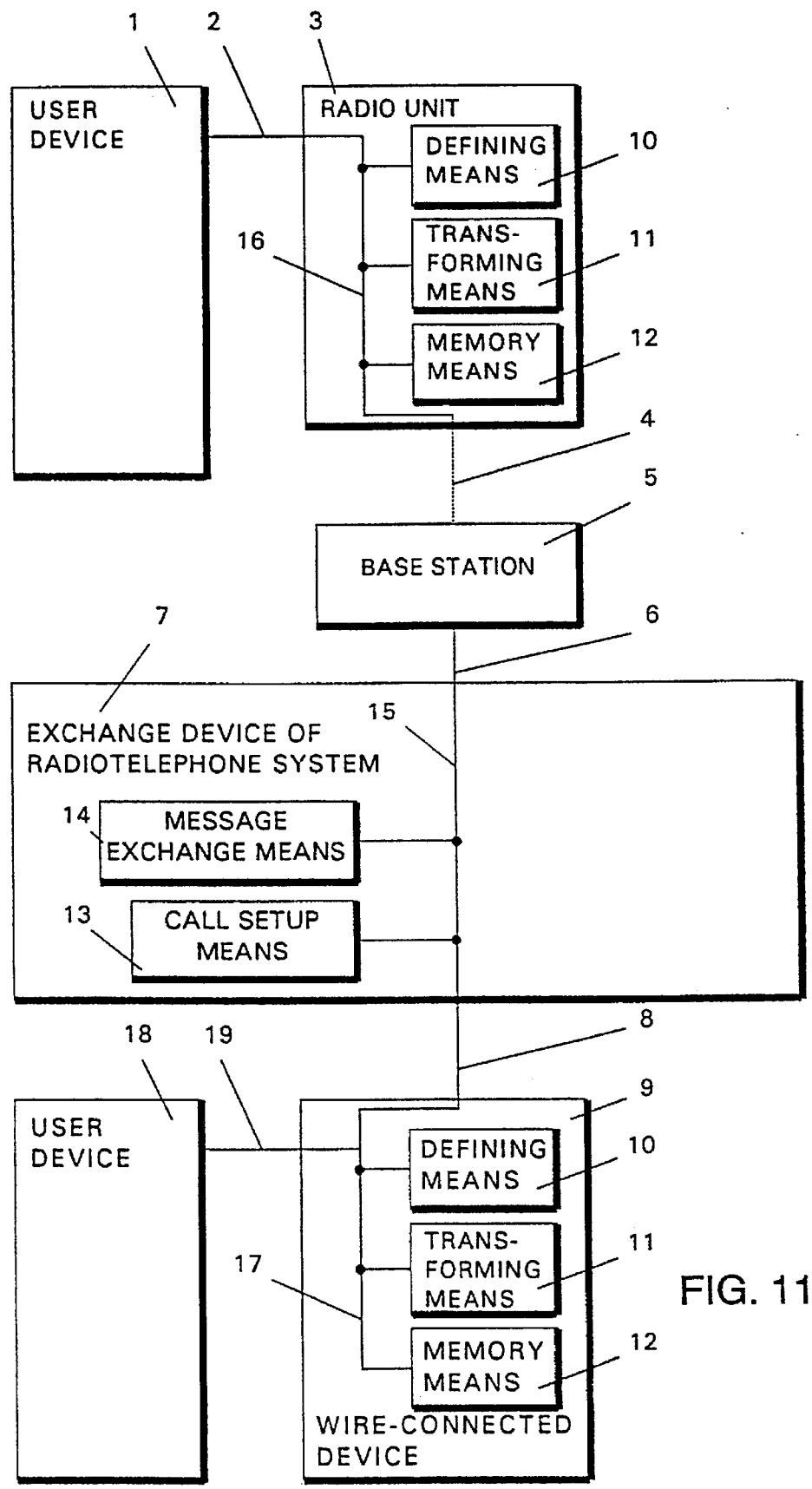

FIG. 11 shows one embodiment of the system according to the invention for establishing a connection in a radio network. In this embodiment, the location area definition means 10, the transforming means 11 and the memory means 12 are located in the radio unit 3 or/and in the wire-connected device 9, instead of some of them being located in the user device 1 or 18 or in the exchange device 7 of the radio system. In this embodiment, the call setup message to be sent from the radio unit or the wire-connected device is similar to that illustrated in FIG. 10.

Figure 12:
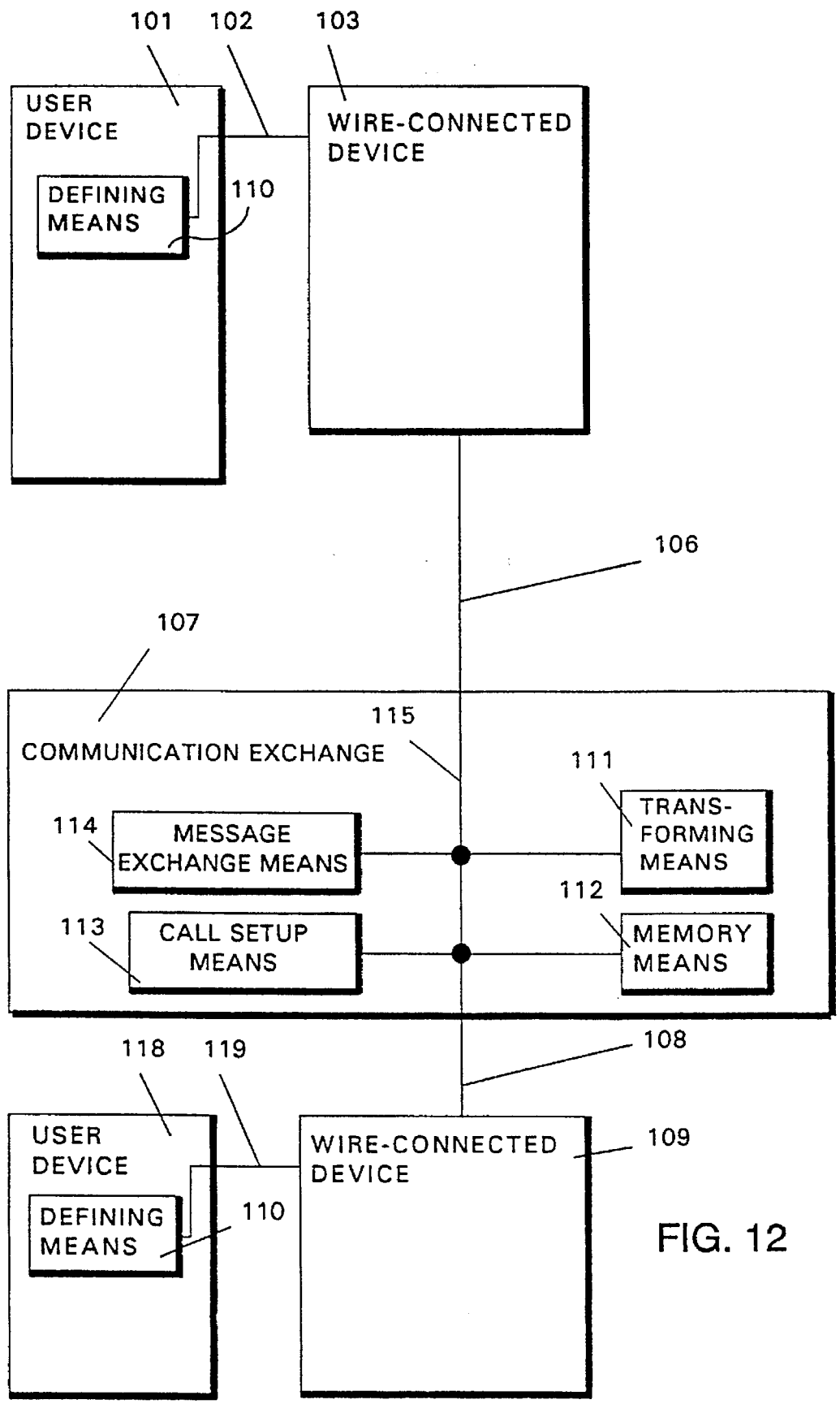

FIG. 12 shows one embodiment of the system according to the invention for defining the location area and/or for establishing a connection in a fixed communication network based on wire connections, e.g. PSTN, ISDN or IN. FIG. 12 shows a first user device 101, 118 provided with a user interface to the communication network. The user device 101, 118 is joined by a connecting means 102, 119, typically a cable, to a wire-connected device 103, 109. The wire-connected device and the user device may naturally be implemented as one unit. There is a connection 106, typically over a cable, between the wire-connected device 103 and a communication exchange 107, incoming data traffic is transmitted over a connecting means 115 to a message exchange means 114 and further to a call setup means 113. To the communication exchange may additionally be joined the wire-connected device 109 over a connection 108, typically a cable, to which device 109 is joined further, by a connecting means 119, the second user device 118, which may be similar to the first user device 101 joined to the wire-connected device 103.

In the system according to the invention, a location area definition means 110 has been connected to the first user device 101. A corresponding location area definition means 110 has been connected to the second user device 118. By means of the definition means 110, the user of the system may define the location area in which the user wishes subscribers provided with a particular identity to be searched for or paged. By the definition means, the user forms a location area definition message as described in FIG. 7, i.e. the user gives the address of that communication device or those communication devices with which the user wishes to establish a connection in the defined location area. The definition of the location area is described in more detail in connection with the specification of FIG. 6.

Figures 13, 14:
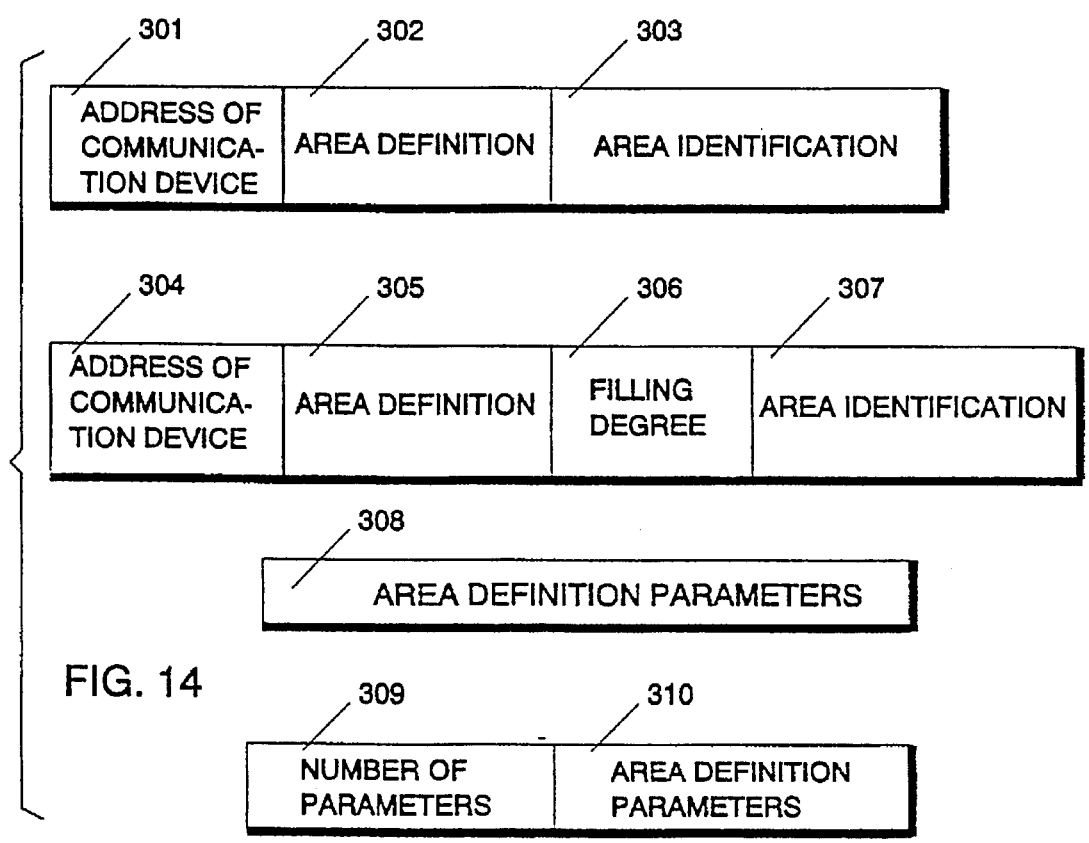

FIG. 13 shows the memory hierarchy of the memory means used by the method and system of the invention. In the memory hierarchy, an identification 202 of the defined location area and identities 203 of the base stations or the communication exchanges located in the defined location area correspond to user identities 201. In the memory hierarchy, it is possible to define several location areas 75, 82 for the same user, i.e. for the called subscriber to be searched for or paged, as has been done with the identification 1234 of the user. Correspondingly, it is possible to define several location areas 150, 151 for one group of subscribers, Group 1. It is also possible to define a location area "whoever", available for all subscribers.

FIG. 14 shows detailed examples of location area definition messages according to the invention. Fields 301, 302, 303 describe a location area definition message similar to that of FIG. 9. In a corresponding way, fields 304, 305, 306, 307 describe a location area definition message illustrated in FIG. 7. Fields 308 or 309 and 310 describe an alternative content of the fields 302 and 305. The area may be defined alternatively by defining the identities of the base stations or the communication exchanges or the identifications of the desired geographical areas, as described in field 308, or by presenting the number of parameters to be used at first in field 309, number of parameters, as well as the actual area definition parameters 310, being typically identifications of those geographical areas which are supposed to be defined as location area. Field 309, number of parameters, presents the number of the points of discontinuity of the geometrical shape typically to be selected to constitute the location area.

The drawings and the specification attached thereto are only intended to illustrate the idea of the invention. As to details, the method and system according to the invention for defining the location area and for establishing a connection between communication devices located in a limited location area may vary within the scope of the claims. Though the method and the system of the invention have been described above in connection with radio networks mainly, the method and system according to the invention may also be used in communication networks of other kinds.

I claim:

1. A method for establishing a connection from a first communication subscriber device having at least one identity and being connected to a communication network comprising exchanges and/or base stations, to one or more second communication subscriber devices capable of moving to any area of the communication network, each second communication subscriber device being connected to the communication network, each second communication subscriber device having at least one identity that is independent of the current location of the respective second communication device, wherein the method comprises the following steps:

(a) defining a search area for the second communication subscriber devices, and an identification for the search area;

(b) sending from the first communication subscriber device to the communication network a call setup message containing the identification of the search area and the respective said identity of at least one of said second communication subscriber devices, (c) paging by the communication network of at least one second communication subscriber device only in the search area defined by said search area identification, (d) establishing a connection to the at least one second communication device provided with a respective said identity only if the at least one second communication device is located in said search area.

2. A method according to claim 1, wherein:

in step (a), said search area is defined by at least one of a dispatcher and the user of said first communication subscriber device.

3. A method according to claim 2, wherein, in step (a):

said search area is defined, thereby providing a search area definition, by one of:

listing identities of base stations contained in the search area, listing identities of communication exchanges contained in said search area, and dividing the geographical area covered by the communication network into typically polygonal parts marked with area identifications and listing the area identifications of the parts contained in the search area.

4. A method according to claim 3, wherein:

in step (a), the dispatcher or the user of a communication subscriber device defines the search area in a first format, from which the search area is automatically transformed to identities of such base stations or communication exchanges the service areas of which cover said search area.

5. A method according to claim 4, wherein:

said first format contains at least one identity at least one said second communication subscriber device, a type of the search area, a filling degree of the search area, a search area definition, and search area identification.

6. A method according to claim 3, wherein:

the search area definition comprises a definition of the geometrical shape of the search area by means of the identities of those geographical parts, base stations or communication exchanges in the area of which are located points of discontinuity of the geometrical shape of the search area, points of vertical intersection of the search area, midpoint and radius of the search area, or midpoint and circumferential point of the search area.

7. A method according to claim 5, wherein:

the search area definition comprises a definition of the geometrical shape of the search area by means of the identities of those geographical parts, base stations or communication exchanges in the area of which are located points of discontinuity of the geometrical shape of the search area, points of vertical intersection of the search area, midpoint and radius of the search area or midpoint and circumferential point of the search area.

8. A method according to claim 3, wherein:

the search area has a filling degree which defines whether the search area shall contain only those parts marked with area identifications, base station identities or communication exchange identities which line the geometrical shape, or also those parts, base stations or communication exchanges marked with area identifications and located within the geometrical shape of the search area.

9. A method according to claim 5, wherein:

said filling degree defines whether the search area shall contain only those parts marked with area identifications, base station identities or communication exchange identities which line the geometrical shape, or also those parts, base stations or communication exchanges marked with area identifications and located within the geometrical shape.

10. A method according to claim 6, wherein:

the geometrical shape is a triangle, rectangle, polygon having more than four sides, or a circle.

11. A method according to claim 8, wherein:

the geometrical shape is a triangle, rectangle, polygon having more than four sides, or a circle.

12. A method according to claim 5, wherein:

the area definition additionally comprises a definition of the number of points of discontinuity of the geometrical shape of the area.

13. A system for establishing a connection between a first communication subscriber device connected to a communication network and one or more second communication subscriber devices connected to the communication network and being capable of moving to any area of the communication network, each said second communication device having at least one identity, wherein the system comprises:

a means for defining a search area, to provide a search area definition, and an identification for this area, to provide a search area definition, and for sending these definitions as a search area definition message from the first communication subscriber device to the communication network, a communication means for receiving a call setup message containing the search area identification sent by the first communication subscriber device to the communication network and the identity of one or more of said second communication subscriber devices, for sending the call setup message to one or more of said second communication subscriber devices located in said defined search area and for establishing a connection between the first and one or more of said second communication subscriber devices.

14. A system according to claim 13, further comprising:

a memory means for storing the search area definition and the search area identification.

15. A system according to claim 13, wherein said communication means further comprises:

a call setup means for establishing connections between the first and one or more of said second communication subscriber devices, a memory means for storing said search area definition, a means for receiving the search area definition messages and call setup messages sent by the first communication subscriber device and for transmitting said call setup messages to said call setup means and for transmitting the search area definition messages to the memory means.

16. A system according to claim 14, wherein:

said means for defining the search area and the identification therefor is connected to the first communication subscriber device for the communication means.

17. A system according to claim 13, including:

a transforming means for transforming the search area definition into identities of such base stations or communication exchanges the service areas of which essentially cover the search area.

18. A system according to claim 14, including:

a transforming means for transforming the search area definition into identities of such base stations or communication exchanges the service areas of which essentially cover the search area.

19. A system according to claim 15, including:

a transforming means for transforming the definition of the search area into identities of such base stations or communication exchanges the service areas of which essentially cover the search area.

\* \* \* \* \*